US010810254B2

(12) United States Patent
Anniballi

(10) Patent No.: US 10,810,254 B2
(45) Date of Patent: *Oct. 20, 2020

(54) UNORDERED MATCHING OF AUDIO FINGERPRINTS

(71) Applicant: iHeartMedia Management Services, Inc., San Antonio, TX (US)

(72) Inventor: Dyon Anniballi, Wayne, PA (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,423

(22) Filed: Jan. 16, 2020

(65) Prior Publication Data

US 2020/0151214 A1 May 14, 2020

Related U.S. Application Data

(63) Continuation of application No. 16/037,346, filed on Jul. 17, 2018, now Pat. No. 10,540,395, which is a continuation of application No. 15/282,691, filed on Sep. 30, 2016, now Pat. No. 10,146,866, which is a continuation of application No. 13/887,988, filed on May 6, 2013, now Pat. No. 9,460,201.

(51) Int. Cl.
  *G06F 7/00* (2006.01)
  *G06F 16/683* (2019.01)
  *G06F 16/638* (2019.01)

(52) U.S. Cl.
  CPC ......... *G06F 16/683* (2019.01); *G06F 16/638* (2019.01)

(58) Field of Classification Search
  CPC ............................ G06F 16/683; G06F 16/638
  See application file for complete search history.

(56) References Cited

U.S. PATENT DOCUMENTS

| 5,437,050 | A  | 7/1995  | Lamb et al. |
| 6,990,453 | B2 | 1/2006  | Wang et al. |
| 7,386,047 | B2 | 6/2008  | Hickey, Jr. |
| 7,577,195 | B2 | 8/2009  | Hickey, Jr. |
| 7,636,390 | B2 | 12/2009 | Hickey, Jr. |

(Continued)

FOREIGN PATENT DOCUMENTS

| WO | 0211123 | 2/2002 |
| WO | 0227600 | 4/2002 |

(Continued)

*Primary Examiner* — Simon King
(74) *Attorney, Agent, or Firm* — Garlick & Markison; Kelly H. Hale

(57) ABSTRACT

A method includes computing match scores for each portion of multiple portions of a first audio fingerprint. The match scores are based on a comparison of the portion with each of multiple portions of a second audio fingerprint. The method includes generating a list of runs based on the highest score for each portion of the multiple portions of the first audio fingerprint. The method includes determining, based on the list of runs, an unordered match between a set of consecutive portions of the first audio fingerprint and a set of non-consecutive portions of the second audio fingerprint. The method includes, in response to determining that a length of the unordered match satisfies a length criterion, outputting an indicator that the first audio fingerprint matches the second audio fingerprint.

20 Claims, 13 Drawing Sheets

(56) References Cited

U.S. PATENT DOCUMENTS

| | | | |
|---|---|---|---|
| 7,788,279 B2 | 8/2010 | Mohajer et al. | |
| 7,853,664 B1 | 12/2010 | Wang et al. | |
| 7,881,657 B2 | 2/2011 | Wang et al. | |
| 8,639,178 B2 | 1/2014 | Anniballi et al. | |
| 9,460,201 B2 | 10/2016 | Anniballi | |
| 10,146,866 B2 | 12/2018 | Anniballi | |
| 2002/0072982 A1 | 6/2002 | Barton et al. | |
| 2002/0161741 A1 | 10/2002 | Wang et al. | |
| 2005/0091275 A1 | 4/2005 | Burges et al. | |
| 2007/0014377 A1 | 1/2007 | Pirak et al. | |
| 2007/0055500 A1 | 3/2007 | Bilobrov | |
| 2007/0124756 A1* | 5/2007 | Covell | H04N 5/445 725/18 |
| 2008/0082510 A1 | 4/2008 | Wang et al. | |
| 2008/0205506 A1 | 8/2008 | Hickey | |
| 2009/0290764 A1 | 11/2009 | Fiebrink et al. | |
| 2010/0287196 A1 | 11/2010 | Shields et al. | |
| 2011/0082877 A1 | 4/2011 | Gupta et al. | |
| 2011/0099197 A1 | 4/2011 | Wang et al. | |
| 2011/0106587 A1 | 5/2011 | Lynch et al. | |
| 2011/0173185 A1 | 7/2011 | Vogel | |
| 2011/0247042 A1 | 10/2011 | Mallinson | |
| 2012/0078894 A1 | 3/2012 | Jiang et al. | |
| 2012/0215329 A1 | 8/2012 | Jiang et al. | |
| 2013/0052939 A1 | 2/2013 | Anniballi et al. | |
| 2013/0139674 A1 | 6/2013 | Whitman et al. | |
| 2013/0162902 A1 | 6/2013 | Musser, Jr. et al. | |
| 2013/0254793 A1 | 9/2013 | Anniballi et al. | |
| 2014/0002749 A1 | 1/2014 | Pora et al. | |
| 2014/0028914 A1 | 1/2014 | Polak et al. | |
| 2014/0108441 A1* | 4/2014 | Samari | H04H 60/58 707/758 |
| 2014/0129571 A1* | 5/2014 | Scavo | G06F 16/48 707/748 |
| 2014/0185815 A1 | 7/2014 | Roblek et al. | |
| 2014/0254807 A1 | 9/2014 | Fonseca, Jr. et al. | |
| 2014/0277641 A1 | 9/2014 | Bilobrov | |
| 2014/0280304 A1 | 9/2014 | Scherf et al. | |
| 2014/0282672 A1 | 9/2014 | McMillan | |
| 2015/0170673 A1 | 6/2015 | Lynch et al. | |
| 2016/0042761 A1 | 2/2016 | Motta et al. | |
| 2016/0087735 A1* | 3/2016 | Anniballi | H04H 60/45 455/3.01 |
| 2017/0366847 A1* | 12/2017 | Covell | G06F 16/683 |
| 2018/0139268 A1* | 5/2018 | Fuzell-Casey | H04L 67/306 |
| 2018/0322192 A1 | 11/2018 | Anniballi | |

FOREIGN PATENT DOCUMENTS

| | | |
|---|---|---|
| WO | 02061652 | 8/2002 |
| WO | 03091990 | 11/2003 |
| WO | 2005079499 | 9/2005 |
| WO | 2006012241 | 2/2006 |
| WO | 2008042953 | 4/2008 |

* cited by examiner

1100

1102 — Identify a longest unordered match between the received audio fingerprint (e.g., including X portions of spectral data) and the stored audio fingerprint (e.g., including Y portions of spectral data)

Compute match scores for each of the X portions of the received audio fingerprint with respect to each of the Y portions of the stored fingerprint to generate X*Y match scores

1104 — Identify a highest match score for each of the X portions, excluding match scores for each of the X portions that violate a disorder threshold

1106 — Apply a positional penalty to at least one highest match score (e.g., by scaling the at least one highest match score) in response to determining that the highest match scores for two consecutive portions of the audio fingerprint correspond to two non-consecutive portions of the stored audio fingerprint

1108 — Generate a list of runs based on the identified highest match score for each of the X portions, where the list of runs includes alternating below-threshold runs (which have identified match scores below the similarity threshold) and above-threshold runs (which have identified match scores above the similarity threshold)

1110 — Identify the longest unordered match based on the list of runs

*FIG. 11*

UNORDERED MATCHING OF AUDIO FINGERPRINTS

CROSS-REFERENCE TO RELATED APPLICATIONS

The present U.S. Utility patent application claims priority pursuant to 35 U.S.C. § 120 as a continuation of U.S. Utility application Ser. No. 16/037,346, entitled "UNORDERED MATCHING OF AUDIO FINGERPRINTS", filed Jul. 17, 2018, scheduled to issue as U.S. Pat. No. 10,540,395 on Jan. 21, 2020, which is a continuation of U.S. Utility application Ser. No. 15/282,691, entitled "UNORDERED MATCHING OF AUDIO FINGERPRINTS," filed Sep. 30, 2016, now U.S. Pat. No. 10,146,866 on Dec. 4, 2018, which is a continuation of U.S. Utility application Ser. No. 13/887,988, entitled "UNORDERED MATCHING OF AUDIO FINGERPRINTS," filed May 6, 2013, now U.S. Pat. No. 9,460,201 on Oct. 4, 2016, all of which are hereby incorporated herein by reference in their entirety and made part of the present U.S. Utility patent application for all purposes.

BACKGROUND

Audio fingerprint matching is a process that may be used to identify songs or other items of recorded audio content. For example, a user may use an application executing on a mobile device (e.g., a cellular telephone) to record a segment of a song that the user wishes to identify. The mobile application may compare (or may cause a server to compare) the recorded audio segment to known audio segments in a database to identify the song.

To determine whether an unknown audio segment matches a known audio segment, an ordered comparison between the segments may be performed. Performing the ordered comparison may include selecting a portion of the known audio segment and comparing the selected portion to each portion of the unknown audio segment. When a match is detected, neighboring (i.e., temporally adjacent) portions of the audio segments may be compared in an attempt to "grow" the match backwards and forwards in time. For example, if the initially selected portion of the unknown audio segment is denoted U and its matching portion in the known audio segment is denoted K, growing the match includes comparing portion U−1 with portion K−1 and portion U+1 with portion K+1, comparing portion U−2 with portion K−2 and portion U+2 with portion K+2, etc. If enough of the neighboring portions also match (i.e., the match grows past a threshold amount), an overall match between the known and unknown audio segments is determined.

However, if the unknown audio segment recorded by the user has noise or distortion, the wrong song, or no song, may be identified. Further, if the version of the song recorded by the user is time-stretched or time-squeezed, ordered matching processes may not correctly identify the song, even though the song is in the database. Such time-stretching or time-squeezing may be introduced by radio stations so that a song or sequence of songs fits into a fixed duration of time. Time-stretching or time-squeezing may also occur due to natural differences between live performances and recorded songs. In addition, performing ordered comparisons may consume a large amount of processing resources and the database of known songs may occupy a large amount of memory.

SUMMARY

Systems and methods of performing unordered matching of audio fingerprints are disclosed. In accordance with the described techniques, audio fingerprints may be generated from known and unknown audio segments via spectral analysis. To perform an unordered comparison, a portion of the known audio fingerprint may be selected as a probe. The probe may be "scrubbed" against portions of the unknown audio fingerprint until a match between the probe and a particular portion of the unknown audio fingerprint is detected. In contrast to ordered comparison processes, the described techniques do not attempt to temporally "grow" the match outwards from the probe. Instead, the known fingerprint may be divided into Y portions, and each of the Y portions of the known audio fingerprint may be scrubbed against each of X portions of the unknown audio fingerprint, thereby generating X*Y match scores that can be visualized as an undulating surface. The highest match score for each of the X portions may be identified, which can be visualized as a bar graph. The bar graph can be divided into alternating "runs" of match scores that are consecutively above or below a similarity threshold. If the longest run of above-threshold match scores satisfies a length criterion, a match between the known and unknown audio segments may be detected. Length criteria may vary depending on the programming element (e.g., advertisement vs. song) and station (e.g., radio station, television channel, Internet media source, etc.) associated with the known audio fingerprint.

In certain implementations, additional fingerprint matching operations may be performed. For example, because each portion of the unknown audio fingerprint is compared to each portion of the known audio fingerprint, the same portion of the known audio fingerprint may be determined as the closest match for multiple portions of the unknown audio fingerprint. To control whether such repetition is permitted, a disorder penalty may be applied when determining the highest match score for each of the X portions. A disorder threshold may represent how many times a specific portion of the known fingerprint can be repeated in the unknown fingerprint. As another example, unordered matching may result in a determination that two consecutive portions of the unknown audio fingerprint most closely match two non-consecutive portions of the known audio fingerprint. In such situations, a positional penalty can be applied by scaling down match scores.

In a particular aspect, a method includes determining, at a processor of a device, an unordered match between a set of consecutive portions of a first audio fingerprint and a set of non-consecutive portions of a second audio fingerprint. The method also includes, in response to determining that a length of the unordered match satisfies a length criterion, outputting an indicator that the first audio fingerprint matches the second audio fingerprint.

In another particular aspect, an apparatus includes a processor. The processor is configured to determine an unordered match between a set of consecutive portions of a first audio fingerprint and a set of non-consecutive portions of a second audio fingerprint. The processor is also configured to, in response to determining that a length of the unordered match satisfies a length criterion, generate an indicator that the first audio fingerprint matches the second audio fingerprint.

In another particular aspect, a computer-readable storage device stores instructions that, when executed by a computer, cause the computer to perform operations including determining an unordered match between a set of consecutive portions of a first audio fingerprint and a set of non-consecutive portions of a second audio fingerprint. The operations also include, in response to determining that a length of the unordered match satisfies a length criterion, outputting an indicator that the first audio fingerprint matches the second audio fingerprint.

In another particular aspect, a method includes receiving an audio fingerprint from a listening device. The method also includes, in response to determining that a portion of a stored audio fingerprint substantially matches a portion of the received audio fingerprint, identifying a longest unordered match between the received audio fingerprint and the stored audio fingerprint that satisfies a similarity threshold. The method further includes, in response to determining that the identified longest unordered match satisfies a length criterion, detecting a match between the received audio fingerprint and the stored audio fingerprint.

In another particular aspect, an apparatus includes a network interface configured to receive an audio fingerprint from a listening device. The apparatus also includes a processor and a memory storing instructions that, when executed by the processor, cause the processor to perform operations. The operations include, in response to determining that a portion of a stored audio fingerprint substantially matches a portion of the received audio fingerprint, identifying a longest unordered match between the received audio fingerprint and the stored audio fingerprint that satisfies a similarity threshold. The operations also include, in response to determining that the identified longest unordered match satisfies a length criterion, detecting a match between the received audio fingerprint and the stored audio fingerprint.

In another particular aspect, a computer-readable storage device stores instructions that, when executed by a computer, cause the computer to perform operations including receiving an audio fingerprint from a listening device. The operations also include, in response to determining that a portion of a stored audio fingerprint substantially matches a portion of the received audio fingerprint, identifying a longest unordered match between the received audio fingerprint and the stored audio fingerprint that satisfies a similarity threshold. The operations further include, in response to determining that the identified longest unordered match satisfies a length criterion, detecting a match between the received audio fingerprint and the stored audio fingerprint. Identifying the longest unordered match includes scaling at least one match score when consecutive portions of the received audio fingerprint are determined to be similar to non-consecutive portions of the stored audio fingerprint.

BRIEF DESCRIPTION OF THE DRAWINGS

FIG. 11 is a flow chart to illustrate a particular aspect of a method of identifying a longest unordered match;

DETAILED DESCRIPTION

Figure 1:
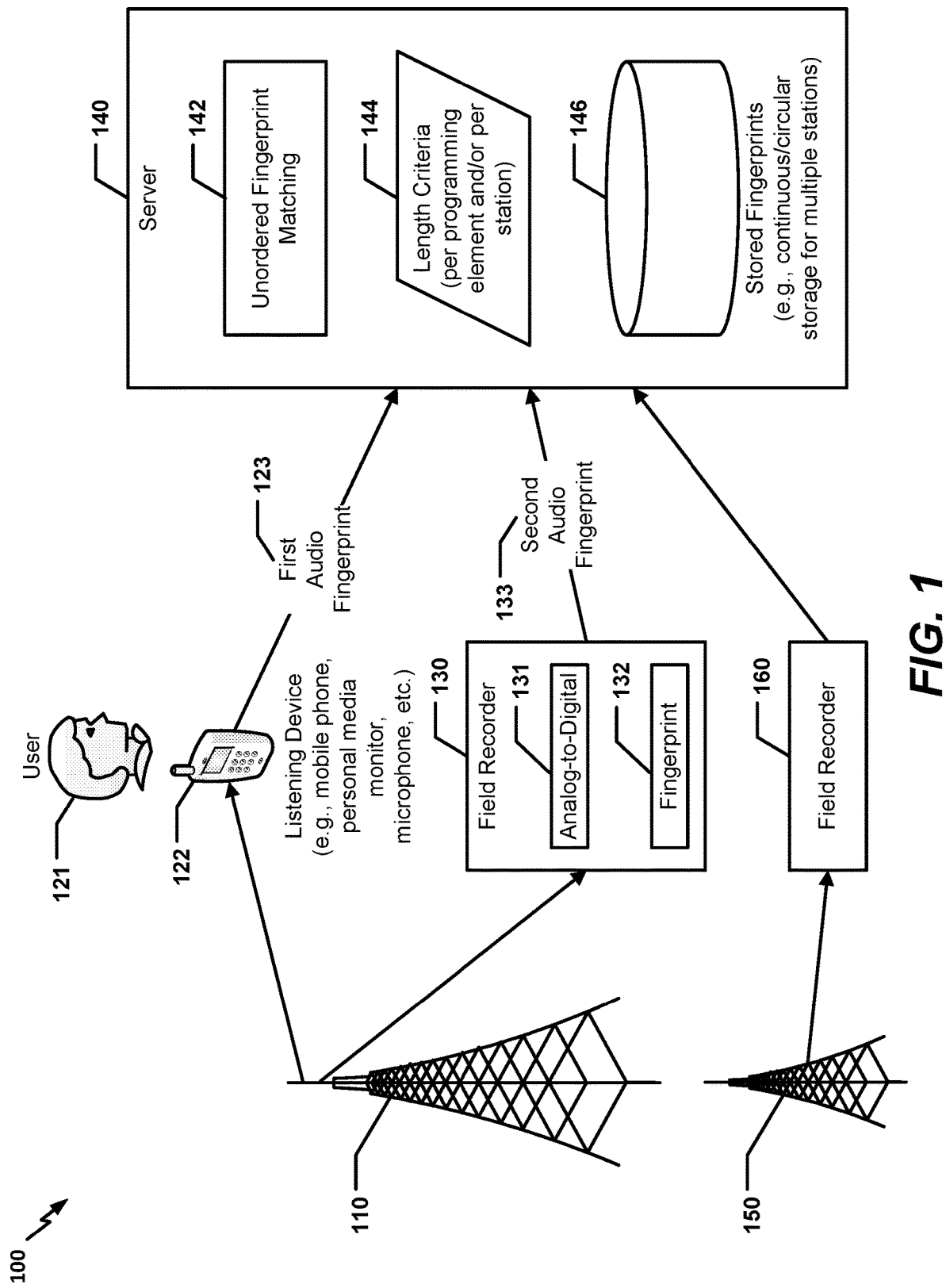
FIG. 1 is diagram to illustrate a particular aspect of a system that is operable to perform unordered matching of audio fingerprints.

FIG. 1 illustrates a particular aspect of a system 100 that is operable to perform unordered matching of audio fingerprints. The system 100 may include one or more audio sources, such as radio stations, television channels, and Internet media sources. In the illustrated example, the system 100 includes a first antenna 110 corresponding to a first radio station and a second antenna 150 corresponding to a second radio station. The system 100 may also include one or more listening devices (e.g., an illustrative listening device 122 corresponding to a user 121) and one or more field recorders (e.g., illustrative field recorders 130 and 160). In a particular aspect, at least one field recorder may be present for each audio source in the system 100. The system 100 may further include a server 140 that can send data to and receive data from the listening device 122 and the field recorders 130, 160 (e.g., via a network, such as the Internet).

The listening device 122 may be a mobile telephone, a personal media monitor, or another electronic device that includes a microphone or other audio capture device. In a particular aspect, the listening device 122 includes a software application and/or hardware components configured to record ambient audio, convert the recorded audio data from analog to digital audio data, and perform spectral analysis of the digital audio data to generate a first audio fingerprint 123. The listening device 122 may transmit the first audio fingerprint 123 to the server 140. For example, the first audio fingerprint 123 may be transmitted via a network (e.g., the Internet) using a wireless data connection (e.g., an institute of electrical and electronics engineers (IEEE) 802.11 connection), a mobile communication connection, etc. Examples of mobile communications systems include, but are not limited to, third generation (3G) systems (e.g., enhanced data rates for global system for mobile communications (GSM) evolution (EDGE), code division multiple access (CDMA) 2000 (CDMA2000), and universal mobile telecommunications system (UMTS)) and fourth generation (4G) systems (e.g., long term evolution (LTE) advanced (LTE-A) and mobile worldwide interoperability for microwave access release 2 (Mobile WiMAX Release 2)). In a particular aspect, the first audio fingerprint 123 is generated in response to user input (e.g., the user activating a song or station identification application on the listening device). Alternately, the first audio fingerprint 123 may be generated automatically (e.g., the listening device 122 may be a personal media monitor that the user 121 has agreed to carry, so that a monitoring service can use data received from numerous such listening devices to determine radio listenership, television ratings, etc.).

In a particular aspect, the first audio fingerprint 123 may be considered an "unknown" audio fingerprint, because the server 140 does not receive or have access to identification information (e.g., metadata) regarding the unknown audio fingerprint. The first audio fingerprint 123 may include or may be accompanied with a timestamp and/or information identifying or otherwise describing the user 121 associated with the listening device 122.

The field recorders 130 and 160 may be computing devices that include a microphone or other audio capture device. The field recorders 130 and 160 may be put in the field by a monitoring service or other commercial entity. The field recorders 130 and 160 may include software application(s) and/or hardware components configured to record the audio signals transmitted by the antennas 110 and 150, respectively. Each of the field recorders 130 and 160 may be configured to convert recorded analog audio to digital audio data and to generate audio fingerprints by performing spectral analysis on the digital audio data. For example, the first field recorder 130 includes an analog-to-digital conversion module 131 and a fingerprint module 132. Although not shown in FIG. 1, the second field recorder 160 may include similar modules. The field recorders 130 and 160 may transmit audio fingerprints to the server 140 via a network, such as the Internet. For example, in FIG. 1, the field recorder 130 transmits a second audio fingerprint 133 to the server 140. In a particular aspect, the field recorders 130 and 160 transmit audio fingerprints to the server 140 in accordance with a configurable periodicity. Because each of the field recorders 130 and 160 is assigned to a particular station, the audio fingerprints transmitted by the field recorders 130 and 160 to the server 140 may include or may be accompanied with station identification information (e.g., metadata identifying a radio station, a television channel, or an Internet media source) in addition to a timestamp. Thus, the second audio fingerprint 133 may be considered a "known" audio fingerprint. In a particular aspect, known audio fingerprints may also identify, or may include or be accompanied with data that can be used to identify, a song title, an artist, and an album in the case of a song, an advertisement name and an advertiser in the case of an advertisement, etc.

In an alternate aspect, the field recorders 130 and 160 generate and transmit encoded audio streams to the server 140, and the server 140 generates audio fingerprints based on the encoded audio streams. Similarly, the listening device 122 may generate and transmit an encoded audio file to the server 140, and the server 140 may generate an audio fingerprint (e.g., the first audio fingerprint 123) based on the received audio file.

The server 140 may be a network-accessible computing device (e.g., a cloud computing server) that receives audio fingerprints from field recorders (e.g., the field recorders 130 and 160) and listening devices (e.g., the listening device 122). The server 140 may include an unordered fingerprint matching module 142, length criteria 144, and a data store 146. Alternately, the data store 146 may be located remote to the server 140 and may be accessible to the server 140 via a network. The data store 146 may store audio fingerprints received from field recorders and/or listening devices. For example, the data store 146 may include circular buffers (e.g., first-in-first-out (FIFO) or last-in-first-out (LIFO) buffers) for each monitored station. In a particular aspect, the data store 146 may maintain audio fingerprints corresponding to approximately eight days of audio transmissions of each monitored station.

The unordered fingerprint matching module 142 may perform unordered comparisons between an audio fingerprint received from a listening device and a stored audio fingerprint retrieved from the data store 146. In a particular aspect, the server 140 is configured to compare an audio fingerprint received from a listening device to multiple stored audio fingerprints simultaneously (e.g., by providing copies of the received audio fingerprint to each of multiple unordered fingerprint matching modules). To illustrate, the server 140 may store the second audio fingerprint 133 received from the field recorder 130 in the data store 146. Upon receipt of the first audio fingerprint 123, the unordered fingerprint matching module 142 may retrieve the second audio fingerprint 133 from the data store 146 and may perform an unordered comparison between the audio fingerprints 123 and 133. In a particular aspect, the unordered comparison results in identification of a longest "run" (e.g., segment) of the unknown audio fingerprint 123 that sufficiently matches a segment of the known audio fingerprint 133. The unordered fingerprint matching module 142 may determine whether the longest run satisfies one or more of the length criteria 144. In a particular aspect, the length criteria 144 may vary by programming element. For example, if metadata indicates that the second audio fingerprint 133 represents an advertisement, the longest run may need to be 80% of the length of the second audio fingerprint 133 for a match to be detected. As another example, if the second audio fingerprint 133 represents a song, the longest run may need to be 90% of the length of the second audio fingerprint 133 for a match to be detected. The length criteria 144 may also vary by station. To illustrate, the first station associated with the first antenna 110 may have different length criteria than the second station associated with the second antenna 150. In a particular aspect, the length criteria 144 may be user-configurable. Examples of unordered fingerprint matching are further described with reference to FIGS. 2-12.

During operation, the field recorders 130 and 160 may generate and transmit audio fingerprints to the server 140. The server 140 may store the audio fingerprints at the data store 146. Upon receipt of the unknown audio fingerprint 123, the unordered fingerprint matching module 142 may perform unordered comparisons between the unknown audio fingerprint 123 and various known audio fingerprints that are stored in the data store 146. In a particular aspect, the server 140 may perform one or more actions when a match between the unknown fingerprint 123 and a known audio fingerprint is detected. For example, the server 140 may transmit advertisement/song/station identification information to the listening device 122. As another example, the server 140 may store (e.g., in a database) data identifying the station associated with the known audio fingerprint 133, the timestamp corresponding to the unknown audio fingerprint 123, and an identifier of the user 121. The database may subsequently be used to determine station and song listenership. Alternately, or in addition, the data may be sold or licensed to third parties.

The system 100 of FIG. 1 may thus enable unordered matching between unknown and known audio fingerprints. Performing comparisons of audio fingerprints that are generated from raw audio signals may be more robust than comparisons using metadata. To illustrate, in some situations, the known and unknown audio fingerprints may be generated substantially concurrently. For example, when being used to determine radio listenership, the listening device 122 may generate the first audio fingerprint 123 at substantially the same time as the first field recorder 130 generates the second audio fingerprint 133. In such "live" situations, the audio fingerprints 123, 133 may represent unanticipated or unscripted content. For example, radio noise/distortion, disc jockey (DJ) chatter, etc. may be in audio captured by the listening device 122 and the field recorder 130. It will be appreciated, however, that because such unanticipated content is in both audio fingerprints 123 and 133, a match between the audio fingerprints may still be identified. This may also enable a user to receive correct identification of a song that is currently playing on a radio station, despite the presence of noise, DJ chatter, etc. To illustrate, the song may be identified via the following two steps: 1) match fingerprints to identify the station, and 2) cross reference the timestamp with a known playlist of songs broadcast by the station to identify the song. In other situations, the unknown audio fingerprint 123 may be matched with a known audio fingerprint that was received by the server 140 minutes, hours, or even days prior to receipt of the unknown audio fingerprint 123. For example, such a comparison may be used when determining how many times a radio station repeated a particular song/advertisement or how many times a particular user listened to the particular song/advertisement over the course of a day, a week, etc. As another example, such a comparison may be used to identify songs, advertisements, or programs that are played in a time-shifted fashion (e.g., using a digital video recorder (DVR) or other time-shifting device), so that time-shifted listenership or viewership ratings can be determined (e.g., live-plus ratings, which indicate total listeners/viewers within a period of time, such as a week, following a broadcast).

Figure 2:
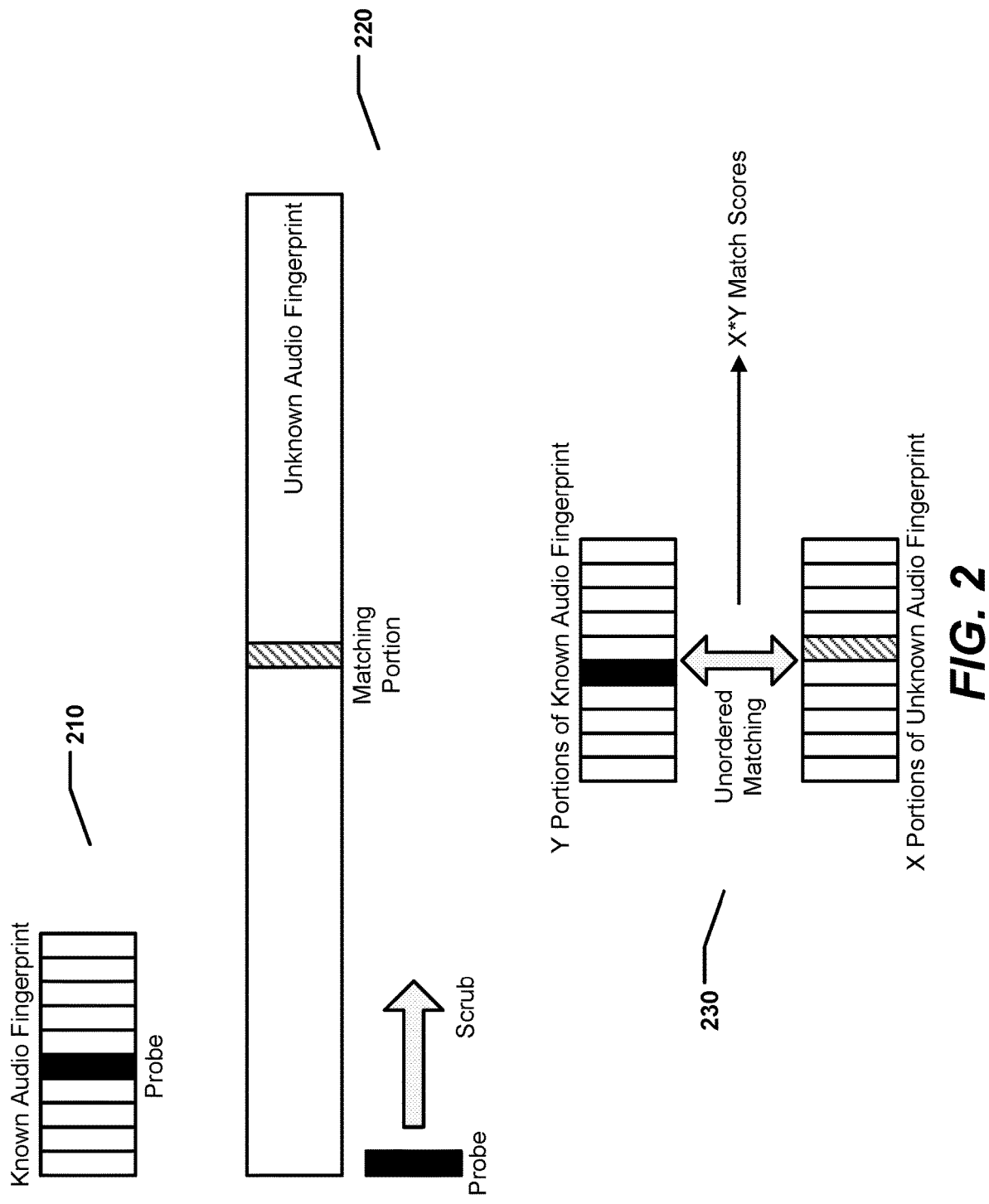
FIG. 2 is a diagram to illustrate a particular aspect of computing match scores during unordered matching of audio fingerprints.

FIGS. 2-9 illustrate a particular aspect of performing unordered matching of audio fingerprints. Turning to FIG. 2, at 210, a portion of a known audio fingerprint that is to be "scrubbed" against an incoming unknown audio fingerprint is selected as a probe. In a particular aspect, the probe includes or represents sixteen audio samples that are each one tenth of a second in length, where each audio sample includes 48 bits. Thus, the probe may represent 1.6 seconds of audio that can be visualized as a 16×48 grid of bits. It will be appreciated that selecting a probe that represents sixteen audio samples may be preferable to selecting a probe representing only one audio sample, especially in situations where time-stretching or time-squeezing may be present, because a sliding window of sixteen samples may be more likely to produce a match than a single sample.

At 220, the probe is "scrubbed" against a segment of the unknown audio fingerprint to determine whether the probe sufficiently (e.g., substantially) matches any portion of the unknown audio fingerprint. The segment of the unknown audio fingerprint that the probe is being scrubbed against may be considered a "scrub window." In a particular aspect, the probe is determined to substantially match a portion of the unknown audio fingerprint when the probe and the portion have a hamming distance that is less than a threshold. If the probe does not match any portion within the scrub window, the scrub window may be advanced. Alternately, or in addition, another probe may be selected. If the scrub window cannot be advanced (e.g., the end of the known audio fingerprint is reached), a different known audio fingerprint may be selected and retrieved for comparison. In a particular aspect, the probe may be scrubbed against multiple known audio fingerprints simultaneously to more quickly identify a match between the unknown audio fingerprint and a known audio fingerprint.

When a sufficient match between the probe and a portion of the unknown audio fingerprint is detected, additional portions of the known audio fingerprint may be compared against additional portions of the unknown audio fingerprint, at 230. However, unlike ordered matching, which attempts to "grow" the match backwards and forwards in time, the unordered matching techniques described herein compare each portion of the known audio fingerprint (or segment thereof) with each portion of the unknown audio fingerprint (or segment thereof). Thus, unlike ordered matching, unordered matching may include comparing portions of the known audio fingerprint with non-corresponding and non-consecutive portions of the unknown audio fingerprint, and vice versa. To illustrate, the unknown audio fingerprint may include X portions of spectral data and the known audio fingerprint may include Y portions of spectral data (one of which is the probe), where X and Y are integers greater than one. The spectral data for the audio fingerprints may be generated via spectral analysis. For example, spectral data in an audio fingerprint may include transform (e.g., fast Fourier Transform (FFT)) coefficients, mel frequency cepstral coefficients (MFCCs), spectral flatness information, sharpness information, linear predictive coding (LPC) coefficients, etc. After the probe is determined to sufficiently match one of the X portions, each of the X portions may be compared to each of the Y portions, thereby generating X*Y match scores. It should be noted that although the X portions of the unknown audio fingerprint and the Y portions of the known audio fingerprint are illustrated in FIG. 2 as being the same size, this is for illustration only. In alternate aspects, the known audio fingerprint may be broken up into different size pieces (e.g., to balance processor usage, noise tolerance, remix tolerance, etc.). Further, although FIG. 2 illustrates that X and Y are both equal to ten, this is for illustration only. In alternate aspects, X may be larger or smaller than Y.

Figure 3:
FIG. 3 is a table corresponding to the match scores of FIG. 2.
Figure 4:
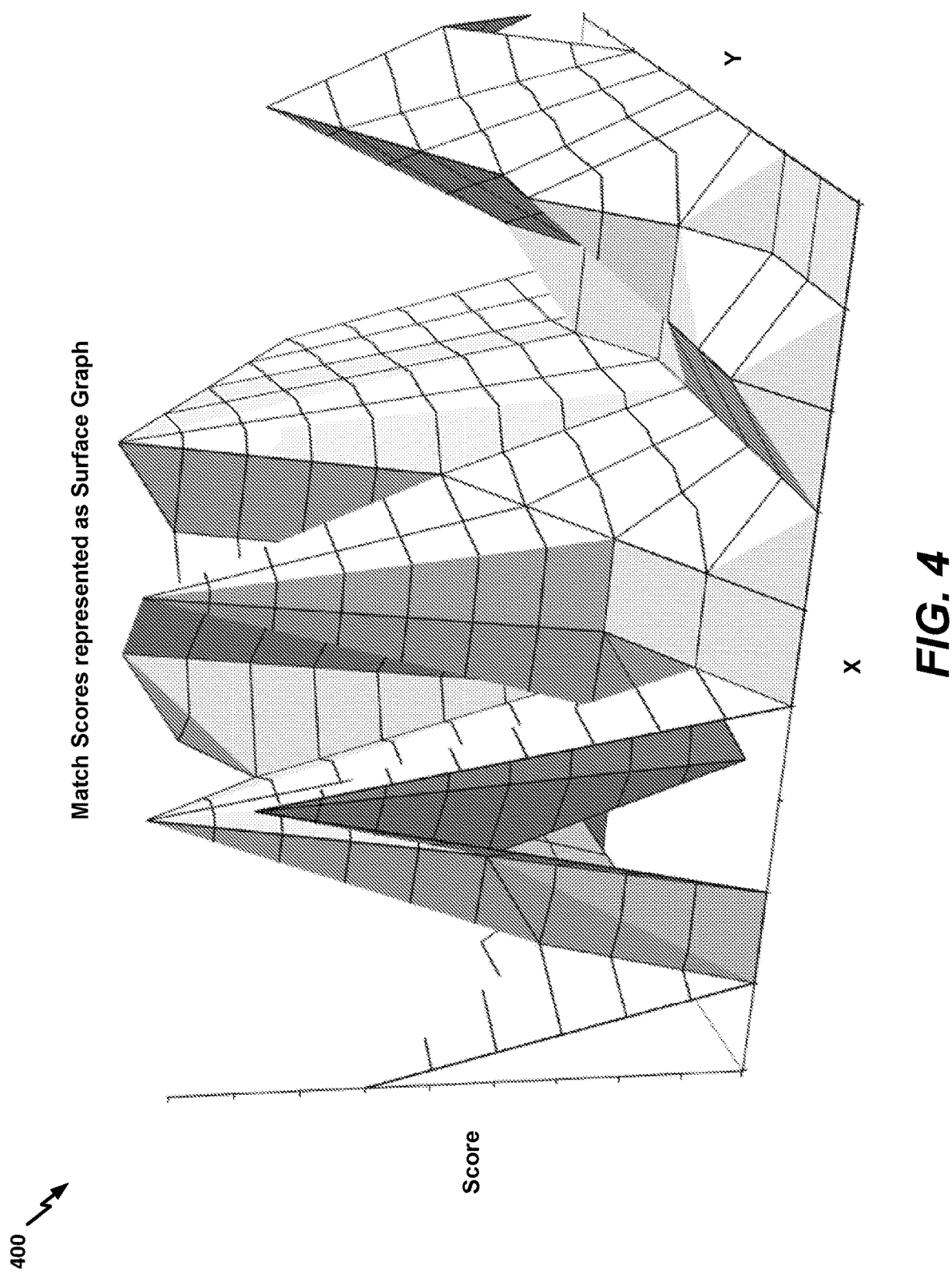
FIG. 4 is an illustrative aspect of a surface graph corresponding to the table of FIG. 3.

Advancing to FIG. 3, an exemplary table 300 of the X*Y match scores is illustrated. In the example shown, the match scores vary from one to ten, with one representing the weakest possible match and ten representing the strongest possible match. In alternate aspects, a different range of match scores may be used. In a particular aspect, the match scores are a function of hamming distance. The X*Y match scores may be visualized as an undulating surface. For example, FIG. 4 illustrates a surface graph 400 corresponding to the match scores in the table 300 of FIG. 3. Surface graphs having a tall and flat region may indicate a greater likelihood of a match than surface graphs that are short or that have many closely spaced peaks and valleys.

Figure 5:
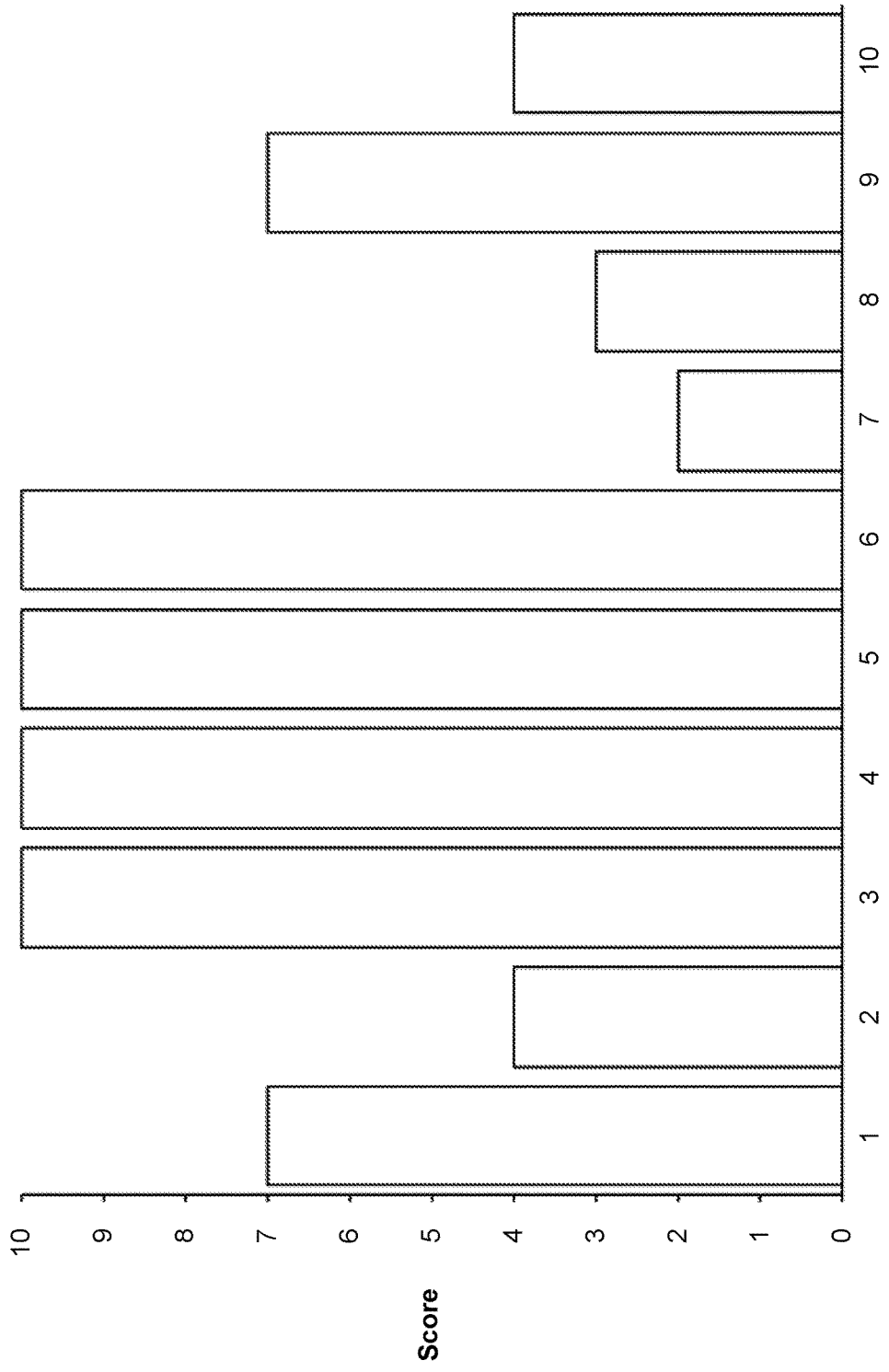
FIG. 5 is a bar graph to illustrate highest match scores identified based on the table of FIG. 3.

After the X*Y match scores are computed, a highest match score for each of the X portions of the unknown audio fingerprint may be identified. For example, as illustrated in FIGS. 3-4, the highest match score for X=1 is 7 (corresponding to Y=1), the highest match score for X=2 is 4 (corresponding to Y=2), etc. FIG. 5 illustrates a bar graph 500 representing the highest match scores from the table 300. In a particular aspect, if enough of the X portions (or a long enough sequence of the X portions) have match scores that are greater than a threshold, an overall match between audio fingerprints may be detected. Alternately, additional operations may be performed, as further described with reference to FIGS. 6-9.

For example, it will be appreciated that the highest match score for each X value may not always represent the "best" match. To illustrate, consider X=9 and X=10. The highest scores for both of these X values corresponds to Y=9. Thus, Y=9 is being "repeated" in the highest match scores, indicating that the audio data corresponding to Y=9 is determined to repeat multiple times in the unknown fingerprint. In situations where remixing or editing of audio is anticipated, such repetition may be acceptable. However, in other situations, such repetition may be unacceptable, and short segments of audio data may result in incorrect matches. For example, a station may cut a song into pieces (e.g., 30 second pieces) and may interleave the pieces with pieces of other songs in a remix. Occasionally, spectral analysis of a short piece of a song may result in an audio fingerprint that resembles random signal noise, such as signal noise that is generated when a radio station goes offline or is experiencing an error. When a station goes offline or experiences an error, the field recorder assigned to the station may record noise that is periodic in nature (e.g., due to effects such as gain boost, alternating current (AC) hum in the field recorder, etc.) and that causes a repeating pattern in the audio fingerprint(s) corresponding to the station. Thus, a stored fingerprint representing such repetitious noise may be matched with a remixed piece of a song.

Figure 6:
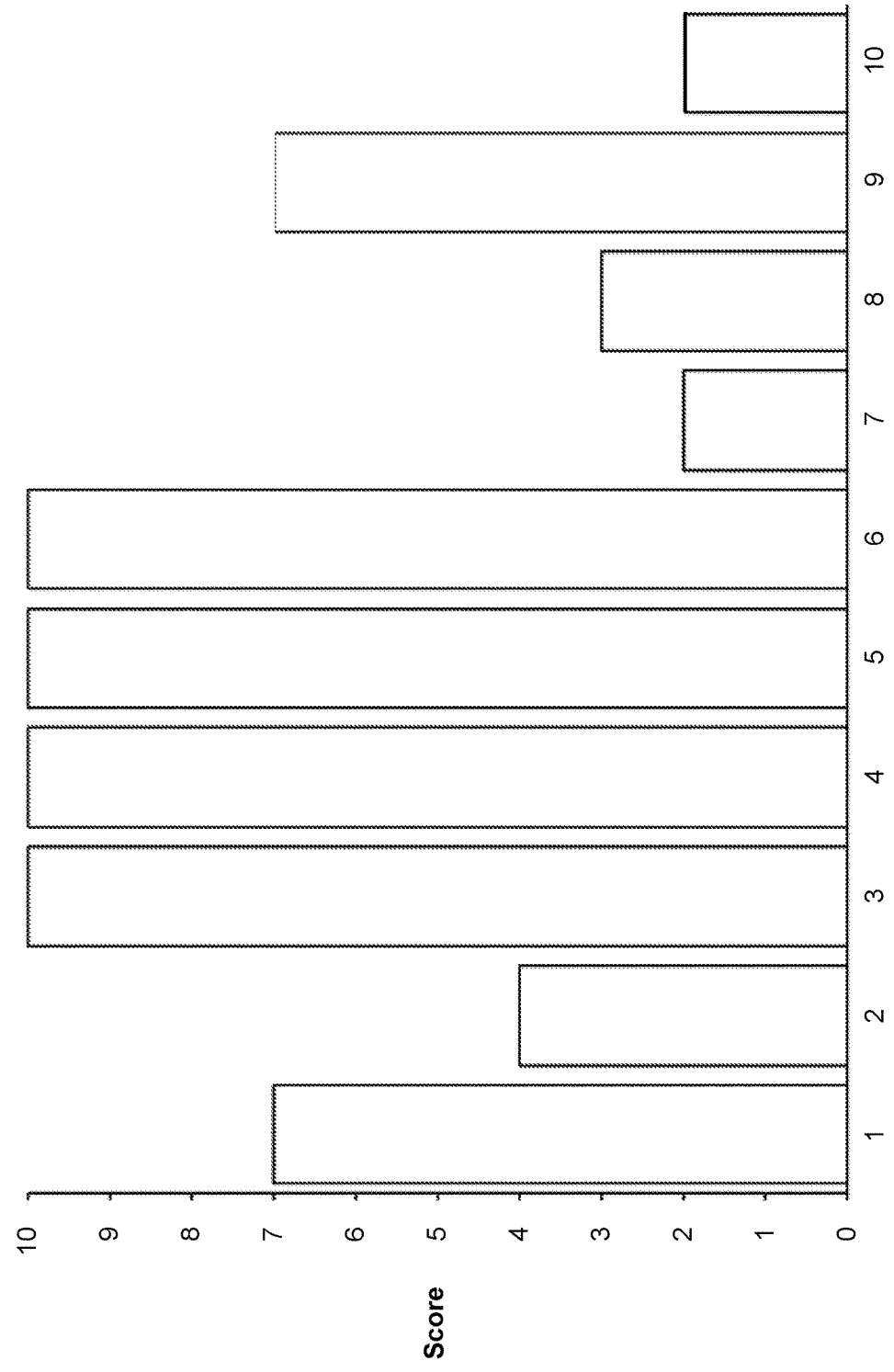
FIG. 6 is a bar graph to illustrate application of a disorder penalty.

To control whether repetition is permitted during fingerprint matching, a disorder penalty may be applied based on a disorder threshold (D). When D=1, each portion of the known audio fingerprint can only appear once in the unknown audio fingerprint, and thus can only contribute once as a highest match score. Conversely, when D is infinity, each portion of the known fingerprint can be repeated an unlimited number of times in the unknown audio fingerprint. FIG. 6 illustrates a bar graph 600 after a disorder penalty is applied when D=1. In FIG. 6, because Y=9 was repeated for X=9 and X=10, the highest match score for X=10 is changed from 4 to 2 (Y=10). Whether the disorder penalty is in effect and the value of the disorder threshold (D) may be configurable by a user (e.g., the user 121 or an administrator of the server 140 of FIG. 1).

Figure 7:
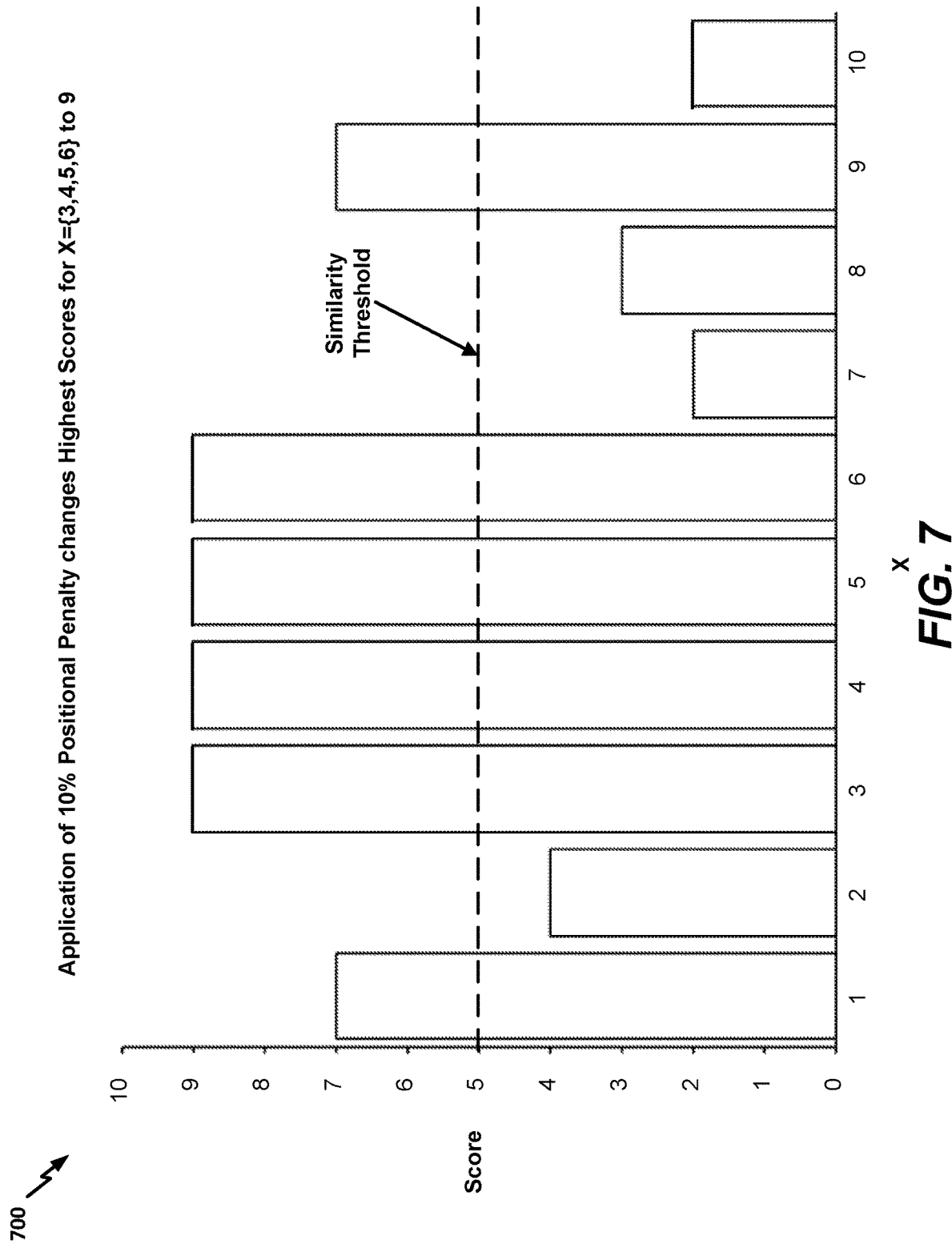
FIG. 7 is a bar graph to illustrate application of a positional penalty.

In a particular aspect, the following algorithm (hereinafter referred to as "Algorithm 1") may be used to identify the highest match scores in view of the disorder penalty (i.e., generate the bar graph 600 of FIG. 6):
1) Generate a list of (X, Y, Score) tuples from the X*Y computed match scores
2) Sort the list in descending order by Score, with a lower X value breaking a tie between Scores and a lower Y value breaking a double tie between Scores and X values
3) If D is infinity (or anything greater than or equal to Y), choose the highest Score for each X value as the highest match score for that X value
4) If D is less than Y, assign as the highest score for each X value the first Score in the list where the Y value corresponding to the Score has not already been used D times In addition to the disorder penalty, a positional penalty may be applied when determining highest match scores. It will be appreciated that when a received audio fingerprint and a stored audio fingerprint are a perfect match, consecutive portions of the received audio fingerprints will best match (i.e., have highest match scores corresponding to) consecutive portions of the stored audio fingerprint. When this is not the case (i.e., when the highest match scores for two consecutive portions of the received audio fingerprint correspond to two non-consecutive portions of the stored audio fingerprint), a positional penalty may be applied by scaling down match scores. FIG. 7 illustrates a bar graph 700 corresponding to the highest match scores of FIG. 6 after application of a 10% positional penalty scales down the highest match scores for X=3, 4, 5, 6 from 10 to 9. Whether the positional penalty is in effect and the scaling amount corresponding to the positional penalty may be configurable by a user (e.g., the user 121 or an administrator of the server 140 of FIG. 1).

The bar graph 700 of FIG. 7 thus represents the highest match scores for each of the X portions of the unknown fingerprint, including application of any penalties that are in effect (e.g., the disorder penalty and the positional penalty).

The highest match scores may be converted into a list of alternating runs that are above and below a similarity threshold. The similarity threshold may be user configurable. In the example of FIG. 7, the similarity threshold is equal to 5. Thus, the bar graph 700 can be converted into the following list of alternating above-threshold (AT) and (below-threshold) runs:
AT: (X=1, Score=7)
BT: (2, 4)
AT: (3, 9); (4, 9); (5, 9); (6, 9)
BT: (7, 2); (8, 3)
AT: (9, 7)
BT: (10, 2)

If the longest above-threshold run in the list of runs is sufficiently long (e.g., satisfies the appropriate length criteria 144 of FIG. 1), a match between the known and unknown fingerprints is detected. As described with reference to FIG. 1, length criteria may be user-configurable, may vary based on programming element, and/or may vary based on station. In addition, length criteria may correspond to an absolute length (e.g., 8 seconds) or a relative length (e.g., 80% of a known audio fingerprint).

In a particular aspect, one or more averaging operations may be performed prior to determining the longest above-threshold run in accordance with the following algorithm (hereinafter referred to as "Algorithm 2"):
1) Iterate through the list of runs. For each below-threshold run that is not the first or last run in the list of runs, average the below-threshold run with the smaller of the neighboring above-threshold runs. If the averaging operation results in an above-threshold run, replace the below-threshold run and both neighboring above-threshold runs with a single aggregate above-threshold run having the average match score of the below-threshold run and both neighboring above-threshold runs.
2) If step 1 resulted in any modifications to the list of runs, repeat step 1.
3) Identify the longest above-threshold run in the list of runs.
4) Iterate through the list of runs. For each above-threshold run that is not the first or last run in the list of runs and not the longest above-threshold run identified in step 3, average the above-threshold run with the smaller of the neighboring below-threshold runs. If the averaging operation results in a below-threshold run, replace the above-threshold run and both neighboring below-threshold runs with a single aggregate below-threshold run having the average match score of the above-threshold run and both neighboring below-threshold runs.
5) If step 4 resulted in any modifications to the list of runs, return to step 1.
6) Identify the longest above-threshold run in the list of runs for comparison to the length criteria.

Figure 8:
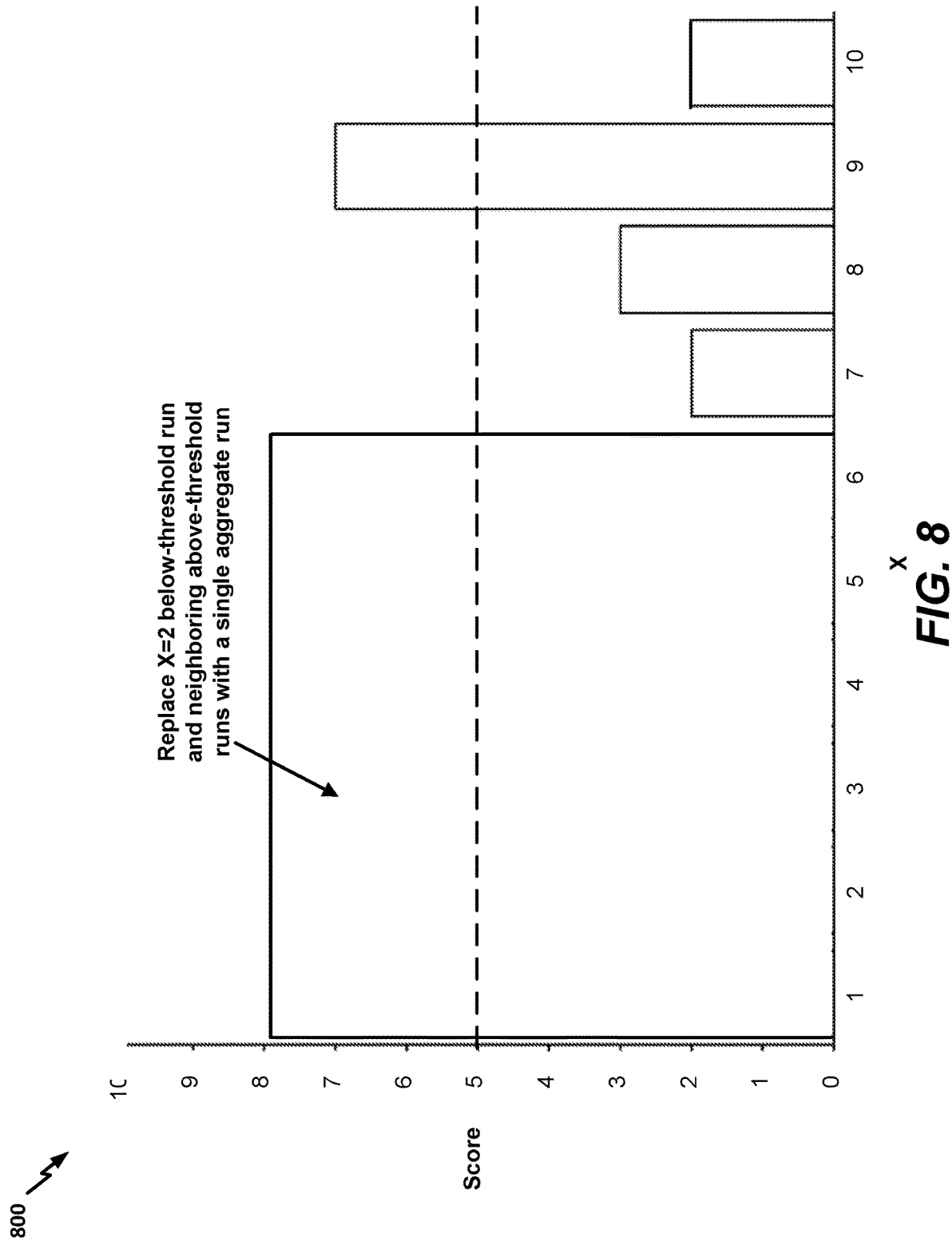
FIG. 8 is a bar graph to illustrate a particular aspect of averaging match scores.

When Algorithm 2 is performed on the list of runs derived from FIG. 7, two aggregations occur. Step 1 of Algorithm 2 results in replacing the X=2 below-threshold run and the neighboring above-threshold runs for X=1 and X=3, 4, 5, 6 with a single above-threshold run with a score of (7+4+9+9+9+9)/6=7.83. FIG. 8 illustrates a bar graph 800 with the aggregate run for X=1, 2, 3, 4, 5, 6.

Figure 9:
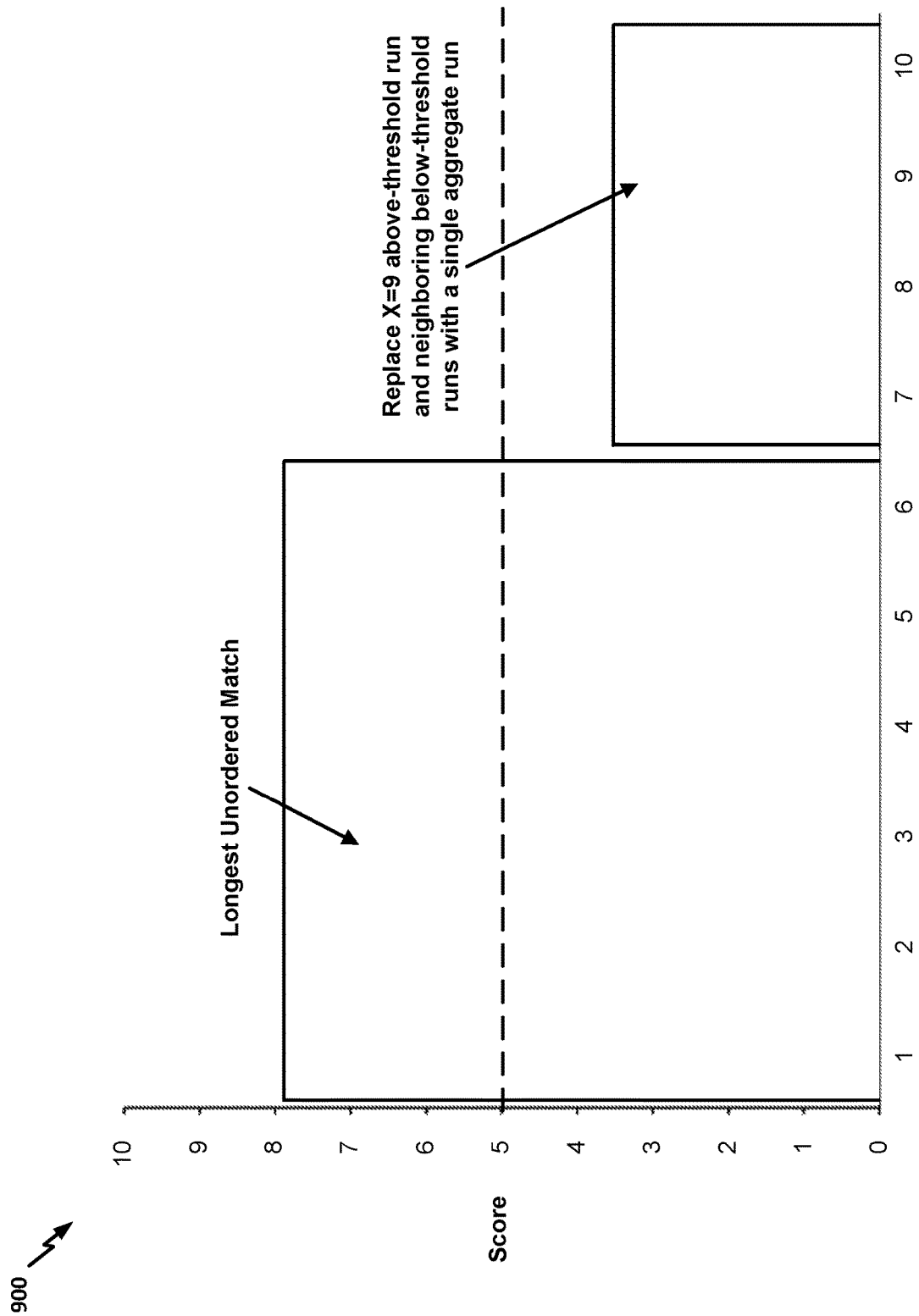
FIG. 9 is a bar graph to illustrate another particular aspect of averaging match scores.

Further, step 4 of Algorithm 2 results in replacing the X=9 above-threshold run and the neighboring below-threshold runs for X=7, 8 and X=10 with a single below-threshold run with a score of (2+3+7+2)/4=3.5. FIG. 9 illustrates a bar graph 900 with the aggregate run for X=7, 8, 9, 10. After completion of Algorithm 2, the longest above-threshold run, i.e., the X=1, 2, 3, 4, 5, 6 run, is identified as the longest unordered match between the received audio fingerprint and the stored audio fingerprint. As described with reference to FIG. 2, each X value corresponds to a portion of the received audio fingerprint that is 1.6 seconds in length. Thus, the longest unordered match has a length of 6*1.6=9.6 seconds, identifying the longest consecutive segment of the unknown audio fingerprint that has match scores above the threshold. However, because the match is unordered, it should be noted that the 9.6 second segment of the unknown fingerprint need not have been determined to match 9.6 consecutive seconds of the known fingerprint. If 9.6 seconds satisfies (e.g., is greater than or equal to) the applicable length criteria, a match between the received (unknown) audio fingerprint and the stored (known) audio fingerprint is detected, and identification data (e.g., station, timestamp, user, location, etc.) representing the match may be stored in a database. In a particular aspect, the received audio fingerprint, which was previously unknown but can now be considered known, may be stored (e.g., in the data store 146 of FIG. 1) for retrieval and comparison to subsequently received unknown audio fingerprints.

It should be noted that the various penalties (e.g., the disorder penalty and the positional penalty) and algorithms (e.g., Algorithm 1 to determine highest match scores and Algorithm 2 to perform averaging operations) are to be considered illustrative and not limiting. In alternate aspects, other penalties/algorithms may be used, penalties may not be used, or penalties may be optional. Thus, the present disclosure is not limited by the specific examples, aspects, and algorithms described.

Figure 10:
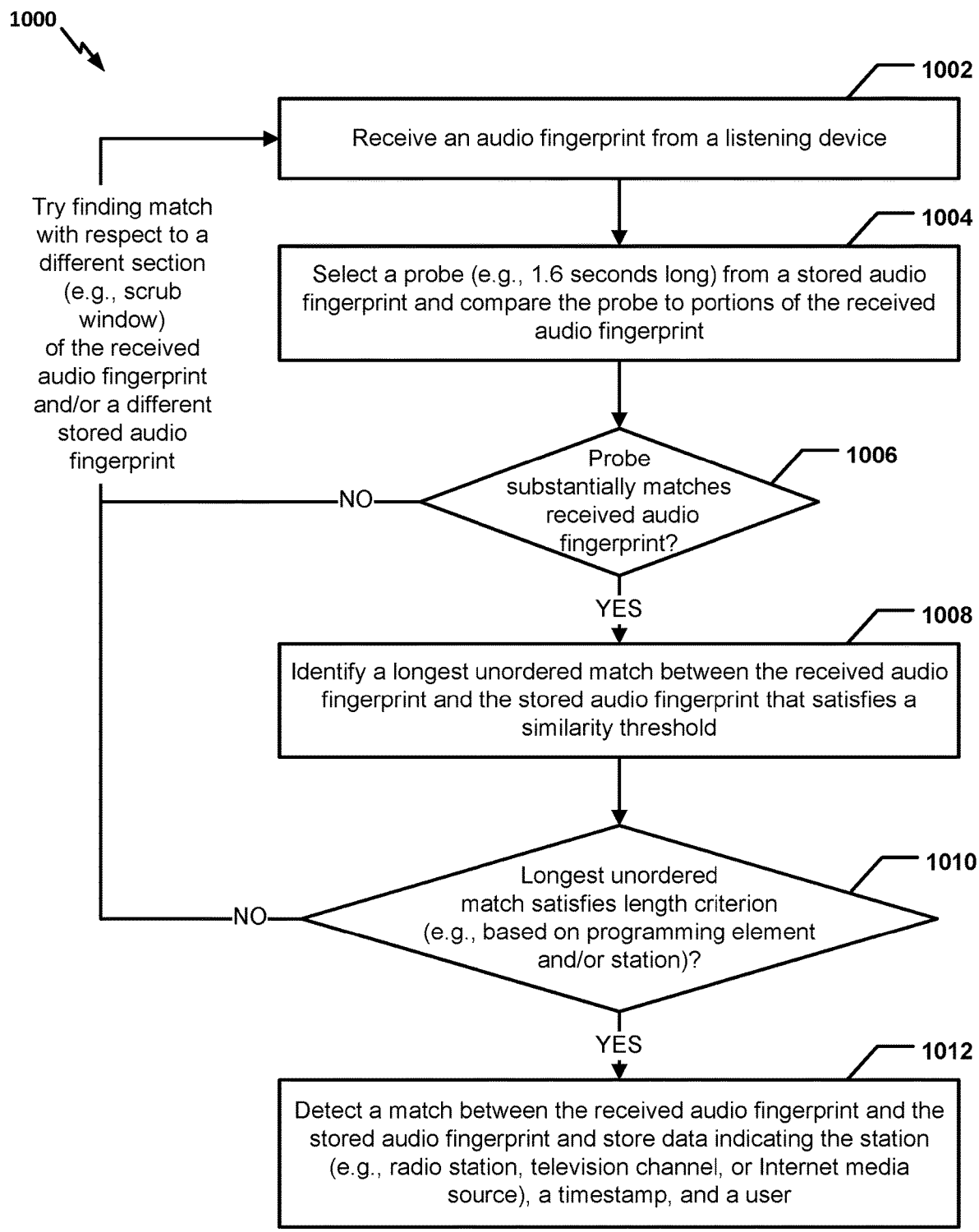
FIG. 10 is a flow chart to illustrate a particular aspect of a method of performing unordered matching of audio fingerprints.

FIG. 10 is a flow chart to illustrate a particular aspect of a method 1000 of performing unordered matching of audio fingerprints. In a particular aspect, the method 1000 may be performed by the system 100 of FIG. 1 and may be illustrated with reference to FIGS. 2-9.

The method 1000 may include receiving an audio fingerprint from a listening device, at 1002. For example, in FIG. 1, the server 140 may receive the first (e.g., unknown) audio fingerprint 123 from the listening device 122.

The method 1000 may also include selecting a probe from a stored audio fingerprint and comparing the probe to portions of the received audio fingerprint, at 1004. For example, in FIG. 1, the second (e.g., known) audio fingerprint 133 may have been received from the field recorder 130 and stored in the data store 146, and the unordered fingerprint matching module 142 may retrieve and select a probe from the second audio fingerprint 133. In an illustrative aspect, the probe may be 1.6 seconds long and may be selected as described with reference to FIG. 2. For example, the probe may be a randomly selected sixteen sample portion of the second audio fingerprint 133, may be the first (e.g., initial) sixteen samples of the second audio fingerprint 133, or may be selected using another method.

The method 1000 may further include determining whether the probe substantially matches a portion of the received audio fingerprint (e.g., within a scrub window), at 1006. When the probe does not substantially match a portion of the audio fingerprint, the method 1000 may return to 1002 and attempt to find a match with respect to a different section (e.g., scrub window) of the received audio fingerprint and/or with respect to a different stored audio fingerprint.

When the probe substantially matches a portion of the received audio fingerprint, the method 1000 may include identifying a longest unordered match between the received and stored audio fingerprints that satisfies a similarity threshold, at 1008. In selected aspects, the longest unordered match may be determined based on computation of match scores, identification of highest match scores, application of a disorder penalty, application of a positional penalty, and/or performing of averaging operations as described with reference to FIGS. 2-9. A particular example of identifying a longest unordered match is further described with reference to FIGS. 11-12.

The method 1000 may include determining whether the longest unordered match satisfies a length criterion, at 1010. The length criterion may vary based on programming element and/or station. For example, in FIG. 1, the unordered fingerprint matching module 142 may determine whether the longest unordered match satisfies one or more of the length criteria 144. When the longest unordered match does not satisfy the length criterion, the method 1000 may return to 1002 and attempt to find a match with respect to a different section (e.g., scrub window) of the received audio fingerprint and/or with respect to a different stored audio fingerprint.

When the longest unordered match satisfies the length criterion, the method 1000 may include detecting a match between the received and stored audio fingerprints, at 1012. In addition, data indicating a station, a timestamp, and a user may be stored (e.g., in a database).

FIG. 11 is a flow chart to illustrate a particular aspect of a method 1100 of identifying a longest unordered match. In a particular aspect, the method 1100 may be performed by the system 100 of FIG. 1 and may be illustrated with reference to FIGS. 2-9. The method 1100 may correspond to step 1008 of FIG. 10 and may be used to identify a longest unordered match between a received audio fingerprint and a stored audio fingerprint. The received audio fingerprint may include X portions of spectral data and the stored audio fingerprint may include Y portions of spectral data, where X and Y are integers greater than one.

The method 1100 may include computing match scores for each of the X portions of the received audio fingerprint with respect to each of the Y portions of the stored fingerprint to generate X*Y match scores, at 1102. For example, the X*Y match scores may be the match scores that are shown in the table 300 of FIG. 3 and in the surface graph 400 of FIG. 4.

The method 1100 also includes identifying a highest match score for each of the X portions, at 1104. Match scores that violate a disorder threshold may be excluded. For example, the highest match scores corresponding to the bar graph 600 of FIG. 6 may be identified, where the match score of 4 for X=10 is excluded due to application of the disorder penalty where the disorder threshold D=1.

The method 1100 may further include applying a positional penalty to at least one highest match score (e.g., by scaling the at least one highest match score) in response to determining that the highest match scores for two consecutive portions of the audio fingerprint correspond to two non-consecutive portions of the stored audio fingerprint, at 1106. For example, a 10% positional penalty may be applied to the match scores for X=3, 4, 5, 6, as shown in the bar graph 700 of FIG. 7.

The method 1100 may include generating a list of runs based on the identified highest match score for each of the X portions, at 1108. The list of runs may include alternating below-threshold runs (which have identified match scores below the similarity threshold) and above-threshold runs (which have identified match scores above the similarity threshold). The method 1100 may also include identifying the longest unordered match based on the list of runs, at 1110. The method 1100 of FIG. 11 may thus enable application of disorder and position penalties when identifying a longest unordered match, which may result in more accurate identification of matches between known and unknown audio fingerprints.

Figure 12:
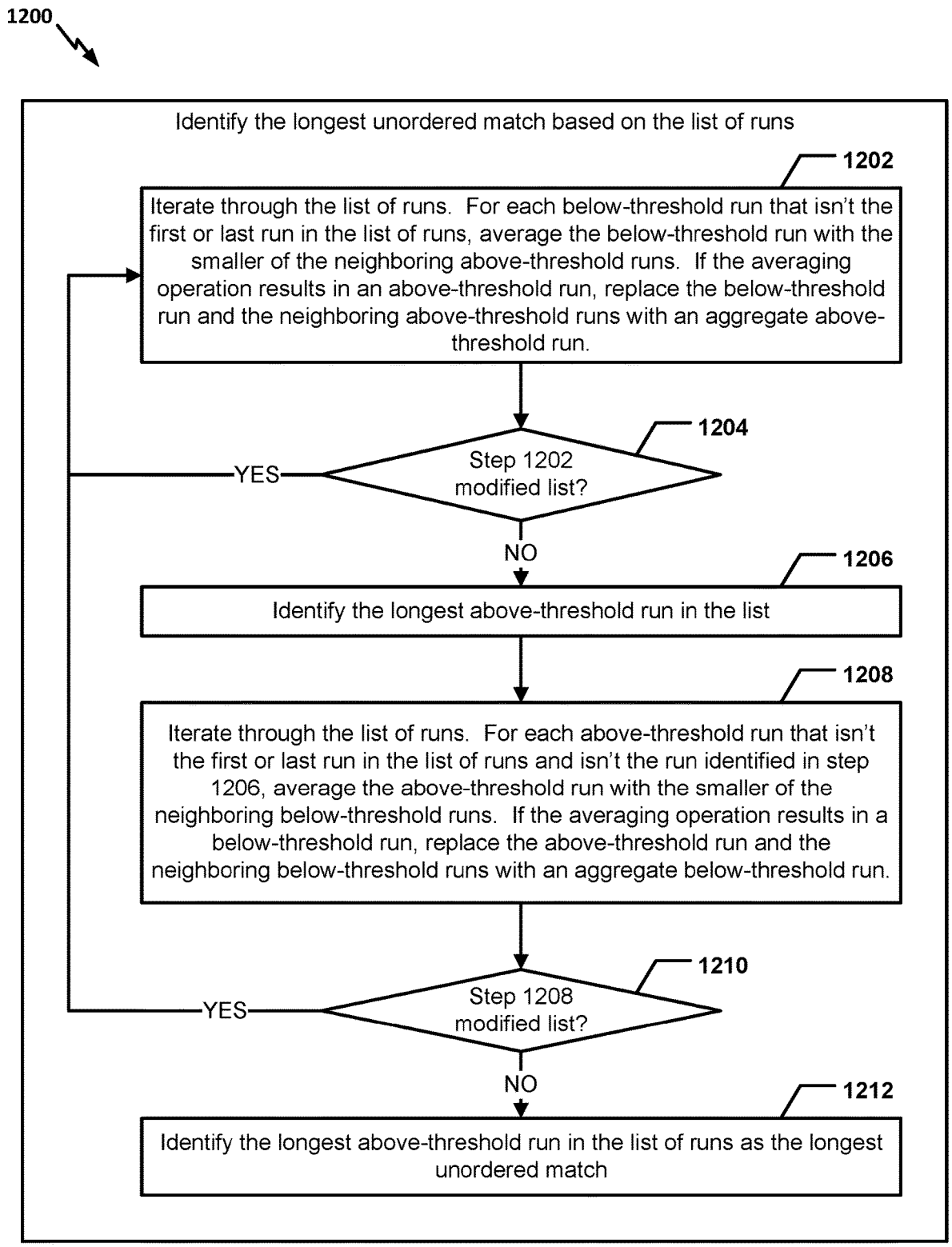
FIG. 12 is a flow chart to illustrate a particular aspect of a method of identifying a longest unordered match based on a list of runs.

FIG. 12 is a flow chart to illustrate another particular aspect of a method 1200 of identifying a longest unordered match based on a list of runs, corresponding to Algorithm 2 described above. In a particular aspect, the method 1200 may be performed by the system 100 of FIG. 1, may be illustrated with reference to FIGS. 2-9, and may correspond to step 1110 of FIG. 11.

At 1202, the method 1200 may include iterating through the list of runs. Each below-threshold run that isn't the first or last run in the list of runs may be averaged with the smaller of the neighboring above-threshold runs. If the averaging operation results in an above-threshold run, the below-threshold run and the neighboring above-threshold runs may be replaced with an aggregate above-threshold run. For example, referring to FIG. 8, a single aggregate above-threshold run may be generated for X=1, 2, 3, 4, 5, 6.

Continuing to 1204, the method 1200 may include determining whether step 1202 resulted in a modification to the list of runs. If so, the method 1200 may return to 1202. If not, the method 1200 may advance to 1206 and may identify the longest above-threshold run in the list of runs.

At 1208, the method 1200 may include iterating through the list of runs. Each above-threshold run that is not the first or last run in the list of runs and is not the run identified in step 1206 may be averaged with the smaller of the neighboring below-threshold runs. If the averaging operation results in a below-threshold run, the above-threshold run and the neighboring below-threshold runs may be replaced with an aggregate below-threshold run. For example, referring to FIG. 9, a single aggregate below-threshold run may be generated for X=7, 8, 9, 10.

Continuing to 1210, the method 1200 may include determining whether step 1208 resulted in a modification to the list of runs. If so, the method 1200 returns to 1202. If not, the method 1200 advances to 1212 and identifies the longest above-threshold run in the list of runs as the longest unordered match. For example, referring to FIG. 9, the above-threshold run for X=1, 2, 3, 4, 5, 6 may be identified as the longest unordered match. If the longest unordered match satisfies a length criterion, an overall match may be detected between audio fingerprints.

Figure 13:
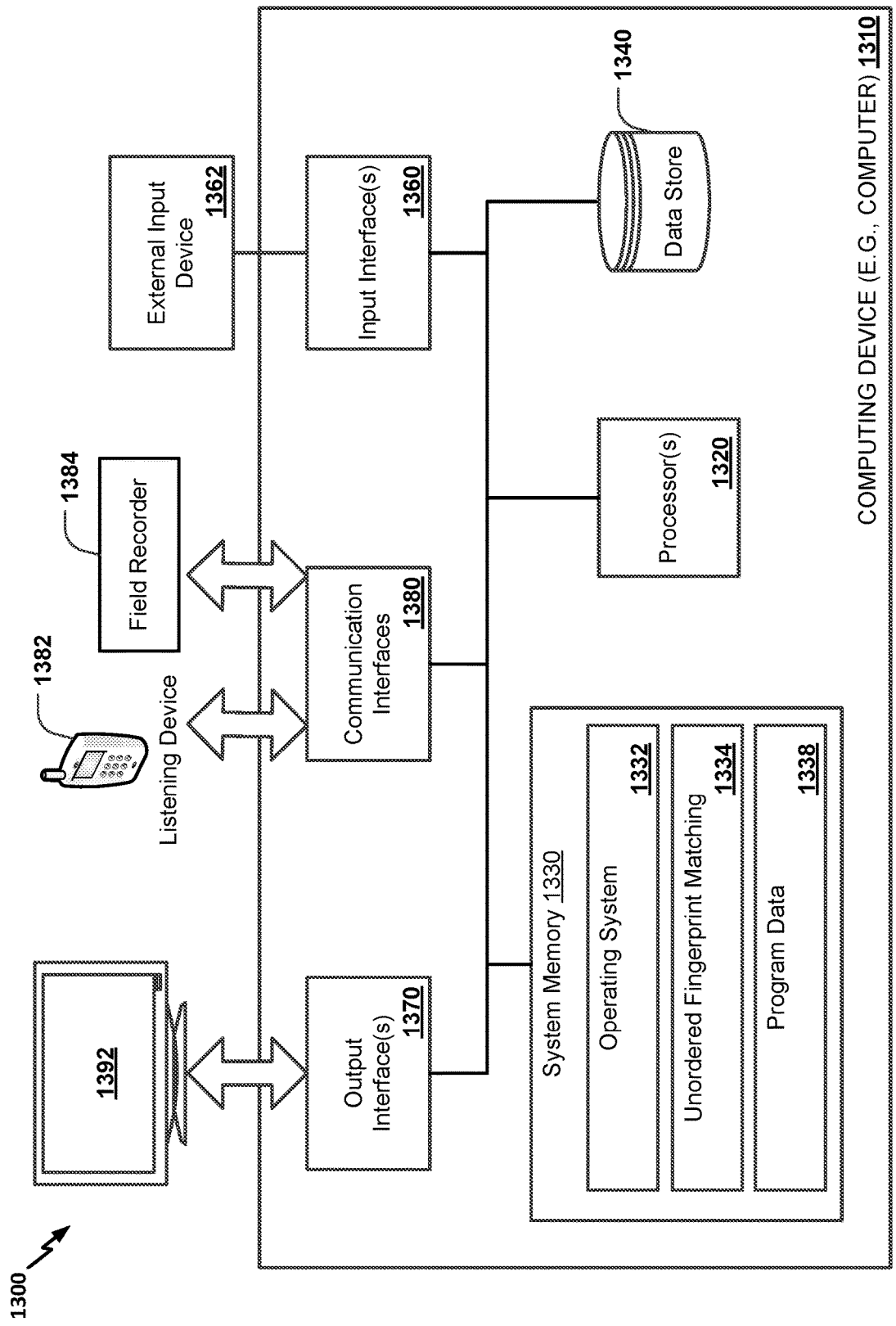
FIG. 13 is a block diagram of an illustrative aspect of a general computer system operable to support aspects of computer-implemented methods, computer program products, and system components as illustrated in FIGS. 1-12.

FIG. 13 is a block diagram of a computing environment 1300 including a computing device 1310 that is operable to support aspects of computer-implemented methods, computer program products, and system components according to the present disclosure.

The computing device 1310 includes at least one processor 1320 and a system memory 1330. For example, the computing device 1310 may be a desktop computer, a laptop computer, a tablet computer, a server, a cloud computing device, or any other fixed or mobile computing device. Depending on the configuration and type of computing device, the system memory 1330 may include volatile (such as random access memory or "RAM"), non-volatile (such as read-only memory or "ROM," flash memory, and similar memory devices that maintain stored data even when power is not provided), a combination thereof, or some other memory. The system memory 1330 may store an operating system 1332. The system memory 1330 may also store an unordered fingerprint matching module 1334 and program data 1338. In an illustrative aspect, the unordered fingerprint matching module 1334 is the unordered fingerprint matching module 142 of FIG. 1 and the program data 1338 includes the length criteria 144 of FIG. 1.

The computing device 1310 may also have additional features or functionality. For example, the computing device 1310 may also include removable and/or non-removable additional data storage devices, such as magnetic disks, optical disks, tape, and memory cards. Such additional storage is illustrated in FIG. 13 by a data store 1340. In an illustrative aspect, the data store 1340 is the data store 146 of FIG. 1. Computer-readable or processor-readable storage media may include volatile and/or non-volatile storage and removable and/or non-removable media implemented in any technology for storage of information such as computer-readable instructions, data structures, program components or other data. The system memory 1330 and the data store 1340 are examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, and other non-transitory media that can be used to store information and that can be accessed by the computing device 1310. Any such computer storage media may be part of the computing device 1310.

The computing device 1310 may also have one or more input devices, such as an external device 1362 connected via one or more input interfaces 1360. One or more output devices, such as an illustrative display device 1392, speakers, a printer, etc. may also be connected to the computing device 1310 via one or more output interfaces 1370. The input interfaces 1360 and the output interfaces 1370 may each include one or more wired or wireless interfaces, such as a universal serial bus (USB) interface, a video graphics array (VGA) interface, a serial interface, a digital visual interface (DVI), a high-definition multimedia interface (HDMI), or some other interface. In certain aspects, such as when the computing device 1310 is the server 140 of FIG. 1, the input interfaces 1360 and the output interfaces 1370 may not be included.

The computing device 1310 has one or more communication interfaces 1380 that enable the computing device 1310 to communicate (e.g., via a network) with other computing devices, such as a listening device 1382 and a field recorder 1384. In an illustrative aspect, the listening device 1382 is the listening device 122 of FIG. 1 and the field recorder 1384 is one of the field recorders 130 or 160 of FIG. 1.

Particular aspects of disclosed techniques may be implemented in conjunction with a client-server architecture. To illustrate, the computing device 1310 may be an application server or other server that provides unordered fingerprint matching functionality. Clients (e.g., the listening device 1382 and the field recorder 1384) may transmit known and unknown audio fingerprints to the server for storage in the data store 1340 and or unordered fingerprint matching by the module 1334.

It will be appreciated that not all of the components or devices illustrated in FIG. 13 or otherwise described in the previous paragraphs are necessary to support aspects as herein described. It will also be appreciated that the computing device 1310 may have additional or different components or devices than illustrated in FIG. 13 or otherwise described in the previous paragraphs.

Although the exemplary aspects described herein are intended to enable a person skilled in the art to practice such aspects, it should be understood that other aspects may be realized and that logical and physical changes may be made without departing from the scope of the present disclosure. Thus, the detailed description herein is presented for purposes of illustration only.

In one aspect, portions of the present disclosure may be implemented using a system that includes a software module, logic engines, computer hardware, databases, and/or computer networks. Moreover, while the description may make reference to specific technologies, system architectures, and data management techniques, it will be appreciated that other devices and/or methods that use different technologies, architectures, or techniques may be implemented without departing from the scope of the disclosure. This disclosure is intended to cover any and all subsequent adaptations or variations of various aspects.

The Abstract is not intended to be used in interpreting or limiting the scope or meaning of the claims. In addition, the disclosure is not to be interpreted as indicating that the claimed aspects require more features than are expressly recited in each claim. Thus, the present disclosure is not intended to be limited to the aspects shown herein but is to be accorded the widest scope possible consistent with the principles and novel features as defined by the following claims.

What is claimed is:

1. A method comprising:
   computing, at a processor of a device, match scores for each portion of multiple portions of a first audio fingerprint, the match scores for a particular portion based on a comparison of the particular portion with each of multiple portions of a second audio fingerprint;
   identifying, at the processor, a highest score of the match scores for each portion of the multiple portions of the first audio fingerprint;
   generating, at the processor, a list of runs based on the highest score for each portion of the multiple portions of the first audio fingerprint;
   determining, based on the list of runs, an unordered match between a set of consecutive portions of the first audio fingerprint and a set of non-consecutive portions of the second audio fingerprint; and
   in response to determining that a length of the unordered match satisfies a length criterion, outputting an indicator that the first audio fingerprint matches the second audio fingerprint.

2. The method of claim 1, further comprising applying, at the processor, a positional penalty to the highest score of the match scores for a first portion of the first audio fingerprint, wherein the positional penalty is applied in response to determining that the highest scores of the match scores for a first set of consecutive portions of the first audio fingerprint correspond to a first set of non-consecutive portions of the second audio fingerprint, and wherein the first set of consecutive portions includes the first portion of the first audio fingerprint.

3. The method of claim 1, further comprising applying, at the processor, a positional penalty to the highest score of the match scores for a first portion of the first audio fingerprint, wherein the match scores for the first portion of the first audio fingerprint include a first score corresponding to a first portion of the second audio fingerprint, wherein the first score is the highest score of the match scores for the first portion of the first audio fingerprint, and wherein applying the positional penalty includes updating the match scores for the first portion of the first audio fingerprint by reducing the first score corresponding to the first portion of the second audio fingerprint.

4. The method of claim 3, further comprising, subsequent to updating the match scores for the first portion of the first audio fingerprint, identifying an updated highest score of the match scores for each portion of the multiple portions of the first audio fingerprint, wherein the list of runs is based on the updated highest score for each portion of the multiple portions of the first audio fingerprint.

5. The method of claim 1, wherein determining the unordered match includes determining that at least one match score corresponding to each portion of the set of consecutive portions of the first audio fingerprint and a corresponding portion of the set of non-consecutive portions of the second audio fingerprint satisfies a similarity threshold.

6. The method of claim 1, further comprising, prior to determining the unordered match:
   determining that a number of portions of the first audio fingerprint have a highest match score corresponding to a first particular portion of the second audio fingerprint; and
   in response to determining that the number of portions exceeds a threshold, removing a particular match score corresponding to the first particular portion of the second audio fingerprint from the match scores.

7. The method of claim 1, wherein the length criterion is user-configurable.

8. The method of claim 1, further comprising receiving the first audio fingerprint from a listening device, wherein the indicator includes data indicating a station associated with the second audio fingerprint, a timestamp corresponding to the first audio fingerprint, a user identifier associated with the listening device, or a combination thereof, and wherein the listening device comprises a microphone, a mobile device, a personal media monitor, or any combination thereof.

9. The method of claim 1, further comprising:
   receiving the second audio fingerprint from a field recorder; and
   storing the second audio fingerprint.

10. The method of claim 1, further comprising selecting a probe from the second audio fingerprint, wherein the match scores are computed in response to determining that the probe substantially matches at least one portion of the first audio fingerprint.

11. The method of claim 10, wherein the probe comprises sixteen audio samples that are each one tenth of a second in length.

12. The method of claim 1, wherein:
   the list of runs includes alternating below-threshold runs and above-threshold runs,
   each below-threshold run corresponds to a sequence of one or more of the multiple portions of the first audio fingerprint that have a highest score that is less than a similarity threshold, and
   each above-threshold run corresponds to a sequence of one or more of the multiple portions of the first audio fingerprint that have a highest score that is greater than or equal to the similarity threshold, wherein the unordered match is based on determining that a longest above-threshold run in the list of runs corresponds to the set of consecutive portions of the first audio fingerprint and to the set of non-consecutive portions of the second audio fingerprint.

13. The method of claim 12, further comprising replacing a below-threshold run in the list of runs with an aggregate of the below-threshold run and neighboring above-threshold runs in response to determining that the aggregate has an average match score that is greater than or equal to the similarity threshold.

14. The method of claim 12, further comprising replacing an above-threshold run in the list of runs with an aggregate of the above-threshold run and neighboring below-threshold runs in response to determining that the aggregate has an average match score that is less than the similarity threshold.

15. The method of claim 1, further comprising determining the length of the unordered match based on a size of each portion of the set of consecutive portions of the first audio fingerprint and a count of portions in the set of consecutive portions of the first audio fingerprint.

16. The method of claim 1, further comprising, in response to determining that the length of the unordered match satisfies the length criterion, updating a count indicating a number of times media content has been played over a time period, wherein the second audio fingerprint represents the media content.

17. An apparatus comprising:
a communication interface configured to receive a first audio fingerprint from a listening device; and
a processor configured to:
compute match scores for each portion of multiple portions of the first audio fingerprint, the match scores for a particular portion based on a comparison of the particular portion with each of multiple portions of a second audio fingerprint;
identify a highest score of the match scores for each portion of the multiple portions of the first audio fingerprint;
generate a list of runs based on the highest score for each portion of the multiple portions of the first audio fingerprint;
determine, based on the list of runs, an unordered match between a set of consecutive portions of the first audio fingerprint and a set of non-consecutive portions of the second audio fingerprint; and
in response to determining that a length of the unordered match satisfies a length criterion, generate an indicator that the first audio fingerprint matches the second audio fingerprint.

18. The apparatus of claim 17, wherein the length criterion is based at least in part on a programming element represented by the second audio fingerprint, wherein the programming element comprises an advertisement programming element or a song programming element.

19. A computer-readable storage device storing instructions that, when executed by a computer, cause the computer to perform operations comprising:
computing match scores for each portion of multiple portions of a first audio fingerprint, the match scores for a particular portion based on a comparison of the particular portion with each of multiple portions of a second audio fingerprint;
identifying a highest score of the match scores for each portion of the multiple portions of the first audio fingerprint;
generating a list of runs based on the highest score for each portion of the multiple portions of the first audio fingerprint;
determining, based on the list of runs, an unordered match between a set of consecutive portions of a first audio fingerprint and a set of non-consecutive portions of the second audio fingerprint; and
in response to determining that a length of the unordered match satisfies a length criterion, outputting an indicator that the first audio fingerprint matches the second audio fingerprint.

20. The computer-readable storage device of claim 19, wherein the operations further comprise:
in response to determining that a first station is associated with the second audio fingerprint, setting the length criterion to indicate a first length; and
in response to determining that a second station is associated with the second audio fingerprint, setting the length criterion to indicate a second length.

* * * * *